Dec. 28, 1965   J. R. HANSON ETAL   3,226,537
VEHICLE LAMP

Filed April 17, 1963   2 Sheets-Sheet 1

INVENTORS.
JOHN R. HANSON
BY KENNETH L. JOHNSON

Meyer, Baldwin, Doran & Egan
ATTORNEYS.

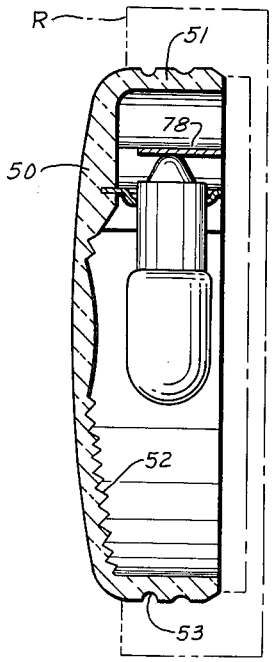
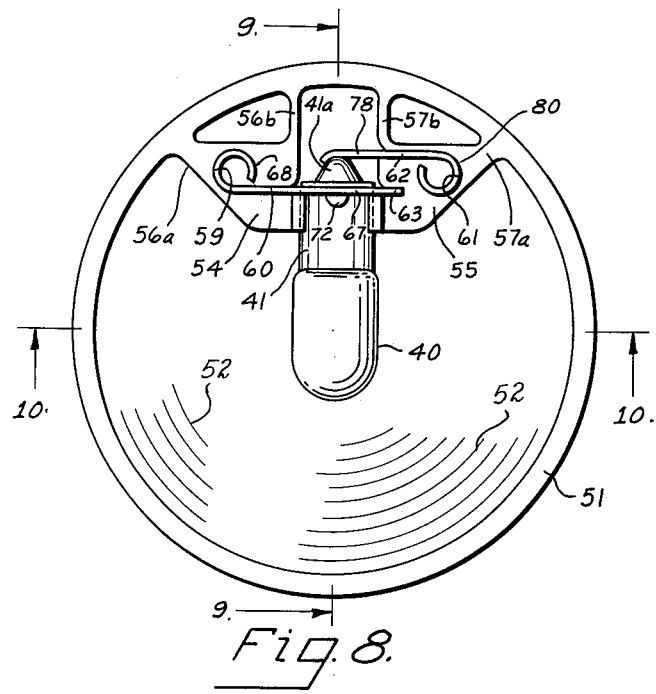
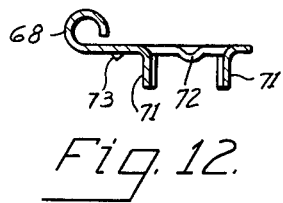
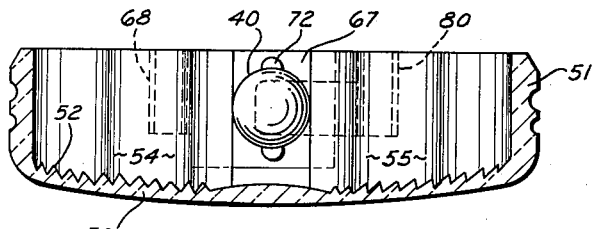
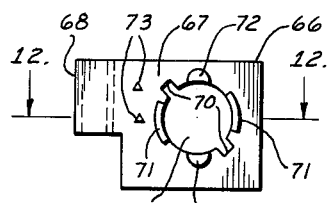
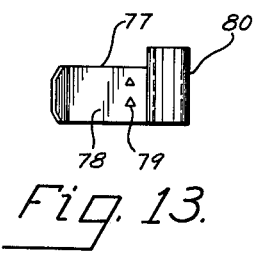
INVENTORS.
JOHN R. HANSON
KENNETH L. JOHNSON
BY
Meyer, Baldwin, Doran & Egan
ATTORNEYS.

United States Patent Office 3,226,537
Patented Dec. 28, 1965

---

3,226,537
VEHICLE LAMP
John R. Hanson, Warren, and Kenneth L. Johnson, Youngsville, Pa., assignors to Betts Machine Company, Warren, Pa., a corporation of Pennsylvania
Filed Apr. 17, 1963, Ser. No. 273,758
5 Claims. (Cl. 240—8.2)

This invention relates to electric lamps and more particularly to an improved vehicle lamp to be used, for example, as a clearance light, marker light, direction signal, tail light or identification light on a vehicle.

An important object of this invention is to provide a vehicle lamp wherein the lens carries a light bulb socket and receptacles for suitable electrical plugs.

Another object of this invention is to provide a vehicle lamp of the above type which is a complete unit in itself comprising both lens and bulb ready to be attached to a suitable holder.

Still another object of this invention is to provide a vehicle lamp having the above characteristics which is readily usable with a variety of mounting devices.

It is also an object of this invention to provide a lamp of the above type having a fewer parts resulting in lower cost as well as less maintenance.

Further objects of the invention and the invention itself will be understood from the following description of two embodiments of the invention and the accompanying drawings in which:

FIG. 8 is a rear elevation of a vehicle lamp according to the second embodiment of the invention;

FIG. 9 is a vertical section taken along the line 9—9 of FIG. 8;

FIG. 10 is a horizontal section taken along the line 10—10 of FIG. 8;

FIG. 11 is a bottom plan view of a socket contact member of the second embodiment of the invention;

FIG. 12 is a section taken along the line 12—12 of FIG. 11; and

FIG. 13 is a bottom plan view of a base contact member of the second embodiment of the invention.

Figure 2:
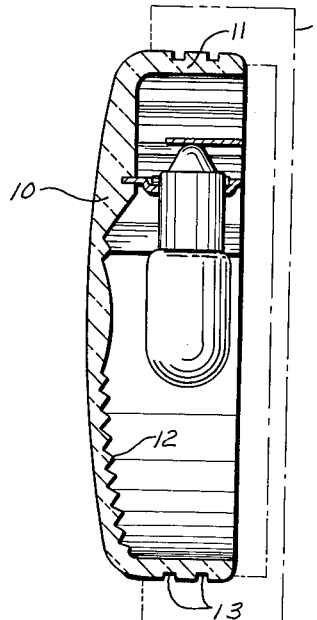
FIG. 2 is a vertical section taken along the line 2—2 of FIG. 1.

Referring now to the first embodiment as illustrated in FIGS. 1-7, the vehicle lamp of this invention comprises a lens 10 having a rearwardly projecting, circumferentially continuous flange 11. The lens 10 is preferably made of a light transmitting material such as glass or transparent plastic, and the rearwardly directed or inner surface of the lens 10 may be provided with light diffusing corrugations as shown at 12.

A pair of laterally spaced body portions or bosses 14 and 15 are integrally formed with and project rearwardly from the lens 10 adjacent to the upper portion of said lens as herein illustrated. The bosses 14 and 15 are integrally connected to the flange 11 by short webs 16 and 17 respectively. The boss 14 has a cylindrical socket 18 formed therein and opening in a rearward direction. The boss 14 also has a transverse slot 19 which opens in a rearward direction and also opens inwardly or laterally at the side of said boss adjacent to the boss 15. The boss 15 is provided with a generally vertically directed slot 20, which opens rearwardly and both upwardly and downwardly from said boss and a horizontal slot 21, which opens rearwardly and at the side of said boss adjacent to the boss 14 and which is coplanar with the slot 19.

Figure 1:
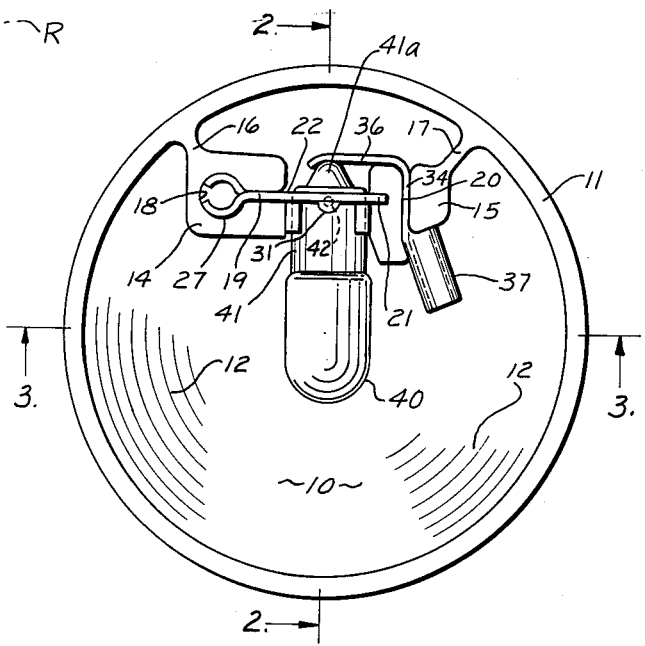
FIG. 1 is a rear elevation of a vehicle lamp according to the first embodiment of the invention.
Figure 5:
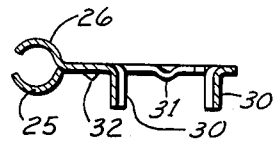
FIG. 5 is a section taken along the line 5—5 of FIG. 4.
Figure 3:
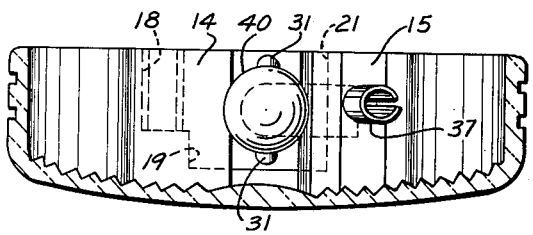
FIG. 3 is a horizontal section taken along the line 3—3 of FIG. 1.
Figure 4:
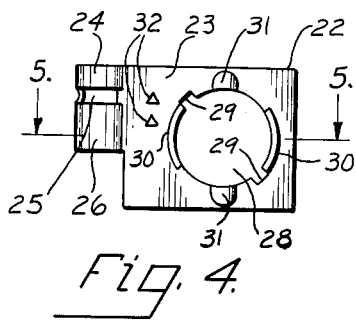
FIG. 4 is a bottom plan view of a socket contact member of the lamp.

The socket 18 and the slot 19 are shaped to receive a socket contact member 22 which is detailed in FIGS. 4 and 5 and shown inserted in the socket and slot of the boss 14 in FIG. 1. The socket contact member 22 is formed of sheet metal and comprises a generally rectangular plate portion 23 having integrally formed, lateral projections 24, 25, and 26. The projections 24 and 26 are semi-circular in form and curved upwardly about an axis parallel with a side edge of the plate portion 23. The projections 25 is disposed longitudinally intermediate the projections 24 and 26 and is similarly curved in the opposite direction about the same axis. As clearly shown in FIG. 5, the semi-circular projections 24-26 provide a reversed C-shaped, integrally formed receptacle 27 along one edge of the plate portion 23.

The plate portion 23 has a generally circular aperture 28 therein having a pair of diametrically opposite notches 29 at the periphery thereof. Said plate portion carries arcuate flange portions 30 which project downwardly from said plate portion at the periphery of the aperture 28 on the counterclockwise sides of the notches 29 as illustrated in FIG. 4. Said plate portion also has diametrically opposite, radially directed grooves 31 formed therein which are spaced clockwise from the notches 29 as seen from the bottom of the socket contact member 22. Outwardly struck prongs 32 of said plate portion are provided for biting into a surface portion of the slot 19 to retain the contact member 22 in its mounted position.

As shown in FIG. 1, the socket contact member 22 is mounted to the bosses 14 and 15 by inserting the plate portion 23 into the coplanar slots 19 and 21 with the receptacle 27 disposed within the socket 18. The plate portion 23 thereby bridges the space between the bosses 14 and 15 with the outer surfaces of the flange portions 30 disposed adjacent to said bosses. This disposes the notches 29 and the grooves 31, which are disposed in a circumferential direction away from the flange portions 30, within the space between the bosses 14 and 15.

Figure 6:
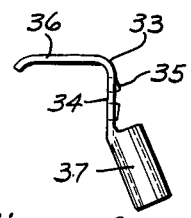
FIG. 6 is a side elevation of a base contact member.
Figure 7:
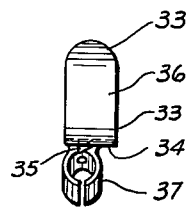
FIG. 7 is a top plan view of the base contact member of FIG. 6.

The slot 20 in the boss 15 is adapted to receive a base contact member 33 which is detailed in FIGS. 6 and 7 and which is shown in its mounted position in FIG. 1. The base contact member 33 is formed from sheet metal and has a central mounting portion 34 having outwardly struck prongs 35. The mounting portion 34 is inserted in the slot 20, and the prongs 35 serve to bite into a wall surface of said slot to retain the base contact member in position. The upper end of the mounting portion 34 has a horizontally directed contact portion 36 which projects inwardly or in the direction of the boss 14 with the distal end thereof disposed generally over the aperture 28 of the socket contact member 22. The lower end of said mounting portion has an integrally formed, C-shaped receptacle 37 which projects obliquely downwardly from the boss 15.

The socket contact member 22 is adapted to receive an incandescent electric light bulb 40 having a nonthreaded base 41 and a pair of diametrically opposite and outwardly projecting lugs 42 carried by said base. The bulb 40 is of the conventional type used in automobiles and similar vehicles and is adapted to be projected upwardly through the aperture 28 between the flange portions 30 with the lugs 42 passing upwardly through the notches 29. The base 41 has an upwardly projecting terminal 41a which abuts the contact portion 36 of the base contact member 33, said contact portion being sufficiently resilient that the lugs 42 can be moved upwardly through the notches 29 above the upper surface of the plate portion 23. Subsequent rotation of the bulb in a clockwise direction and release thereof allows the lugs 42 to drop into the diametrically opposite grooves 31 of the plate portion to be held there by the resilient contact portion 36 pressing downwardly against the terminal 41a. Removal of the bulb 40 is, of course, effected by a reverse procedure: pressing upwardly on the bulb 40, rotating it in a counterclockwise direction until the lugs 42 are aligned with the notches 29, and subsequent movement downwardly of said bulb.

The vehicle lamp described is a complete lamp unit and is adapted to be mounted to a vehicle in any suitable maner such as by means of a holder or receiver R as shown in broken line in FIG. 2. The receiver R may be of any suitable form. For example, it may be made of rubber or other resilient material whereby the lamp is simply pressed into the holder in the position illustrated. The outer surface of the flange 11 may be provided with grooves of the type illustrated at 13 whereby the inner annular surface of said resilient receiver will tend to project into said grooves thereby effecting a suitable weather tight fit. Electrical current for the bulb 40 would, of course, be supplied by suitable conductors (not herein illustrated) having jacks or plugs for insertion into the receptacles 27 and 37.

The second embodiment of the invention differs from the first embodiment primarily in the form taken by the socket and base contact members and the receptacles. The second embodiment of the invention is illustrated in FIGS. 9–13 and comprises a lens 50 having a rearwardly projecting, circumferentially continuous flange 51, the inner or rearwardly directed surface of said lens being provided with light diffusing corrugations 52. The outer peripheral surface of the flange 51 may be provided with grooves 53 for aiding in the weather tight mounting of the lamp in a receiver R. The inner surface of the lens 50 is provided with rearwardly projecting, integrally formed bosses 54 and 55 which are disposed adjacent to the flange 51 at the upper portion of said lens illustrated. The boss 54 is integrally connected with the flange 51 by webs 56a and 56b, and the boss 55 is similarly connected to the flange 51 by webs 57a and 57b.

The boss 54 has a socket 59 which opens rearwardly and laterally connects with a horizontally disposed, tangential slot 60. The boss 55 is similarly provided with a socket 61 which connects to a horizontally disposed, tangential slot 62. The slot 60 of the boss 54 intersects the socket 59 adjacent to the lower periphery thereof, and the slot 62 of the boss 55 intersects the socket 61 adjacent to the upper periphery thereof. The boss 55 is further provided with a short, horizontally disposed slot 63 which is coplanar with the slot 60.

The boss 54 carries a socket contact member 66 of the type detailed in FIGS. 11 and 12. Said socket contact member comprises a plate portion 67 which is similar in construction to the plate portion 23 of the first embodiment of the invention. Said plate portion has a laterally directed projection which is rolled upwardly to form a receptacle 68, said receptacle being formed about an axis which is parallel with the plate portion 67. Said plate portion has a central aperture 69, radiating notches 70, diametrically opposite flange portions 71, and diametrically opposite radiating grooves 72 which are similar to and function in the same manner as the aperture 28, notches 29, flange portions 30, and grooves 31 respectively of the first embodiment. The aperture 69 and its associated elements are adapted to receive an electric light bulb 40 in the same manner as discussed in relation to the aperture 28. The plate portion 67 also has outwardly struck prongs 73 for biting into a surface portion of the slot 60.

As shown in FIG. 8, the socket contact member 66, in use thereof, is inserted with the lateral side portions of the plate portion 67 disposed in the slots 60 and 63 respectively and with the receptacle 68 disposed within the socket 59 of the boss 54.

The boss 55 carries a base contact member 77 which comprises a contact portion 78 having outwardly struck prongs 79 therein and, at one end, an integrally formed, rolled receptacle 80. Said base contact member is mounted to and assembled with the boss 55 with the pronged portion of the contact portion 78 disposed within the slot 62 and the remainder of said contact portion projecting inwardly over the aperture 69 of the socket contact member 66. The receptacle 80 is disposed within the socket 61, and the prongs 79, biting into one surface of the slot 62, retain the base contact member in position. When a bulb 40 is mounted within the socket provided by the aperture 69 and the flange portions 71, the distal end of the contact portion 78 resiliently abuts the terminal 41a and holds the lugs 42 within the grooves 72. In the arrangement according to the second embodiment of the invention, the receptacles 68 and 80 are parallel and closely enough disposed relative to each other that the prongs of a pair of electrical conductors may be mounted together in a single plug element to be inserted therein.

The vehicle lamp of this invention is particularly though not exclusively adapted for use as a safety lamp on a vehicle. For example, it may be used on the side of the vehicle as a clearance light or it may be used as a marker or an identification lamp at the front or rear of the vehicle. It is also ideally suited for use as a signal lamp such as a tail light, stop light or turn signal. Obviously, it has many other uses. The lamp of this invention greatly facilitates the maintenance of a vehicle so equipped because, as a self contained lighting unit, it can be quickly unplugged, removed and replaced with a like lamp whereby the vehicle is not unduly detained for purposes of repairs to its lights. Also, damaged or worn-out light bulbs can be quickly and easily replaced. The lamp of this invention is made as a small compact unit which can be readily carried as a spare. It assures that the bulb is always properly positioned in relation to the lens, and it comprises fewer parts than conventional lamps of this type whereby it is easily manufactured and assembled at a relatively low cost. Although the embodiments of this invention as herein illustrated have shown a single socket means for mounting a single light bulb, it will be readily understood that a single lamp unit need not be limited to one light bulb.

It will be understood that many changes in the details of this invention as herein described and illustrated may be made without, however, departing from the spirit thereof or the scope of the appended claims.

What is claimed is:

1. A lamp comprising a lens; a pair of spaced apart body means rigid with said lens and projecting from an inner surface of said lens; a first sheet metal contact having an integrally formed socket adjacent to one end thereof and a tubular receptacle formed at the other end thereof; a second sheet metal contact having a resilient arm portion at one end thereof and a tubular receptacle formed at the other end thereof; said body means being slotted in a direction generally at right angles to the plane of said lens to receive the tubular end portions of said contacts respectively; said contacts seated within said slots with said socket and said arm disposed in said space between said body means whereby a base of an electric light bulb disposed in said socket is contacted by said arm at the distal end of said base.

2. A vehicle lamp adapted to be inserted as a unit in a receiver mounted upon a vehicle; said lamp comprising a lens; a pair of spaced apart body portions rigid with said lens and projecting from the inner surface thereof; means defining oppositely disposed slots in said body portions opening into said space between said body portions; a first sheet metal contact member bridged across said space with the ends thereof disposed within said slots; said first contact member having an integrally formed socket portion disposed between said body portions and adapted to receive the base of an electric light bulb;

one of said body portions having means defining an additional slot parallel with the spaced from said first mentioned slots; a second sheet metal contact member seated in said additional slot and having a portion thereof projecting into said space for contacting the distal end of a light bulb base disposed within said socket; both said contact members having receptacle means for receiving plugs of electrical conductors.

3. A vehicle lamp adapted to be inserted as a unit in a receiver mounted upon a vehicle; said lamp comprising a lens; a pair of spaced part body portions integrally formed on the inner surface of said lens; a first sheet metal contact member carried by one of said body portions; a second sheet metal contact member carried by said other body portion; said first contact member having a socket portion projecting into said space between said body portions adapted to receive the base of an electric light bulb; said second contact member having a portion projecting into said space and axially spaced from said socket portion for contacting the distal end of an electric light bulb seated in said socket; each said contact member having an integrally formed receptacle for receiving a plug of an electrical conductor; and said lens having a peripheral collar integrally formed therewith and projecting in the same direction as said body portions for insertion into a receiver of a vehicle.

4. A vehicle lamp adapted to be inserted as a unit in a receiver mounted upon a vehicle; said lamp comprising a lens; a pair of spaced apart, solid body portions integrally formed on the inner surface of said lens; means defining a slot in each said body portion opening into the space between said body portions; a first sheet metal contact member seated in one of said slots and having a portion thereof projecting across said space between said body portions; said portion of said first contact member having integrally formed means defining a socket for receiving the base of an electric light bulb; a second sheet metal contact member seated in the other of said slots and having a portion thereof projecting across said space and axially spaced from said socket in such manner as to contact the distal end of a light bulb base seated in said socket; the portion of each said contact member which is seated within one of said slots having an integrally formed receptacle for receiving a plug of an electrical conductor; and said lens having a peripheral collar integrally formed therewith and projecting in the same direction as said body portions for insertion into a receiver of a vehicle.

5. A lamp comprising a lens having front and rear faces; integrally formed boss means protruding from said rear face; a metal socket member for receiving the base of an electric light bulb; said socket member having a receptacle portion formed at one end thereof; a metal contact member; said contact member having a receptacle portion formed at one end thereof; said boss means having slot means for mounting said members; said members having portions thereof of a thickness to fit snugly within said slot means with said contact member being spaced from said socket member and positioned whereby when the base of an electric light bulb is seated within said socket member, said contact member contacts the distal end of the light bulb base; said members and slot means having interfitting surface portions holding said members exactly positioned relative to said lens; both said receptacle portions being adapted to receive plugs of electrical conductors.

References Cited by the Examiner
UNITED STATES PATENTS

| | | | |
|---|---|---|---|
| 1,403,924 | 1/1922 | Topping | 240—8.3 |
| 2,511,893 | 6/1950 | Alden. | |
| 2,704,839 | 3/1955 | Sweet | 240—8.1 X |
| 2,738,413 | 3/1956 | Knapp | 240—7.1 |
| 2,780,721 | 2/1957 | Lenning | 240—10.65 |
| 2,843,730 | 7/1958 | Schwartz | 240—6.45 X |
| 2,853,595 | 9/1958 | Baldwin | 240—8.2 |
| 3,043,948 | 7/1962 | Albinger et al. | 240—1 |
| 3,125,299 | 3/1964 | Woofter et al. | 240—7.1 |
| 3,143,301 | 8/1964 | Trautner et al. | 240—7.1 X |
| 3,145,933 | 8/1964 | Dickson | 240—8.2 |

FOREIGN PATENTS 604,962    5/1960    Italy.

NORTON ANSHER, *Primary Examiner.*